July 25, 1933.  A. E. BORTON  1,919,999
MACHINE FOR FORMING AND FASTENING
Filed Feb. 2, 1932  4 Sheets-Sheet 1

INVENTOR
Alwyn E. Borton
BY
ATTORNEY

July 25, 1933.  A. E. BORTON  1,919,999
MACHINE FOR FORMING AND FASTENING
Filed Feb. 2, 1932   4 Sheets-Sheet 2

INVENTOR
Alwyn E. Borton
BY
ATTORNEY

July 25, 1933.  A. E. BORTON  1,919,999
MACHINE FOR FORMING AND FASTENING
Filed Feb. 2, 1932  4 Sheets-Sheet 4

INVENTOR
Alwyn E. Borton
BY
Philip S. McLean.
ATTORNEY

Patented July 25, 1933

1,919,999

UNITED STATES PATENT OFFICE

ALWYN E. BORTON, OF SOUTH ORANGE, NEW JERSEY, ASSIGNOR, BY MESNE ASSIGNMENTS, TO ASSOCIATED PATENTEES, INC., A CORPORATION OF NEW JERSEY

MACHINE FOR FORMING AND FASTENING

Application filed February 2, 1932. Serial No. 590,419.

The present invention relates to the forming of sheet material to desired shapes and the combining of such shapes in assembled relation.

The general objects of the invention are to enable the working on two or more strips of material at the same time, for example, to simultaneously feed in two strips, shape them and cut them off in predetermined lengths and then fasten such parts together as a completed or partly completed article.

Further objects of the invention are to provide a machine for accomplishing the foregoing ends and which will be of practical design, efficient operation and capable of manufacturing a variety of articles.

Various other objects and the novel features of construction, combinations and relations of parts by which the objects are attained will appear as the specification proceeds.

The drawings accompanying and forming part of the specification illustrate one of the present commercial embodiments of the invention, but it is to be understood that the structure may be modified as regards this particular disclosure without departure from the true scope and broad intent of the invention.

The machine illustrated is of the general type disclosed in Patent No. 1,883,513, dated October 18, 1932, and comprising a set of four cam shafts 15, 16, 17, 18 geared together in quadrangular relation and driven from electric motor 19.

This machine is designed for simultaneously operating on two strips of stock. These strips are shown at 20, 21 in Fig. 1 unwinding from separate spools or rolls supported on reels or tables 22, 23 at opposite sides of the feed line at the entering end of the machine and as tensioned by passing over guide rolls 24 carried by spring arms 25. After leaving the tension rolls, the strips are accurately gaged and brought together into parallel face-to-face relation by the flange edge gaging rolls 26 and opposed guide rolls 27. From this point the two strips, side by side pass through the straightener 28 to the feed slide 29.

The feed slide is of special construction to grip and simultaneously feed the two strips. Details of this feed device are shown in Figs. 9, 10 and 11 which illustrate a movable jaw 30 cooperating with a fixed jaw 31 through an intermediate spacer or strip separator 32.

Figures 7, 8, 9, 10, 11, 12, 13:
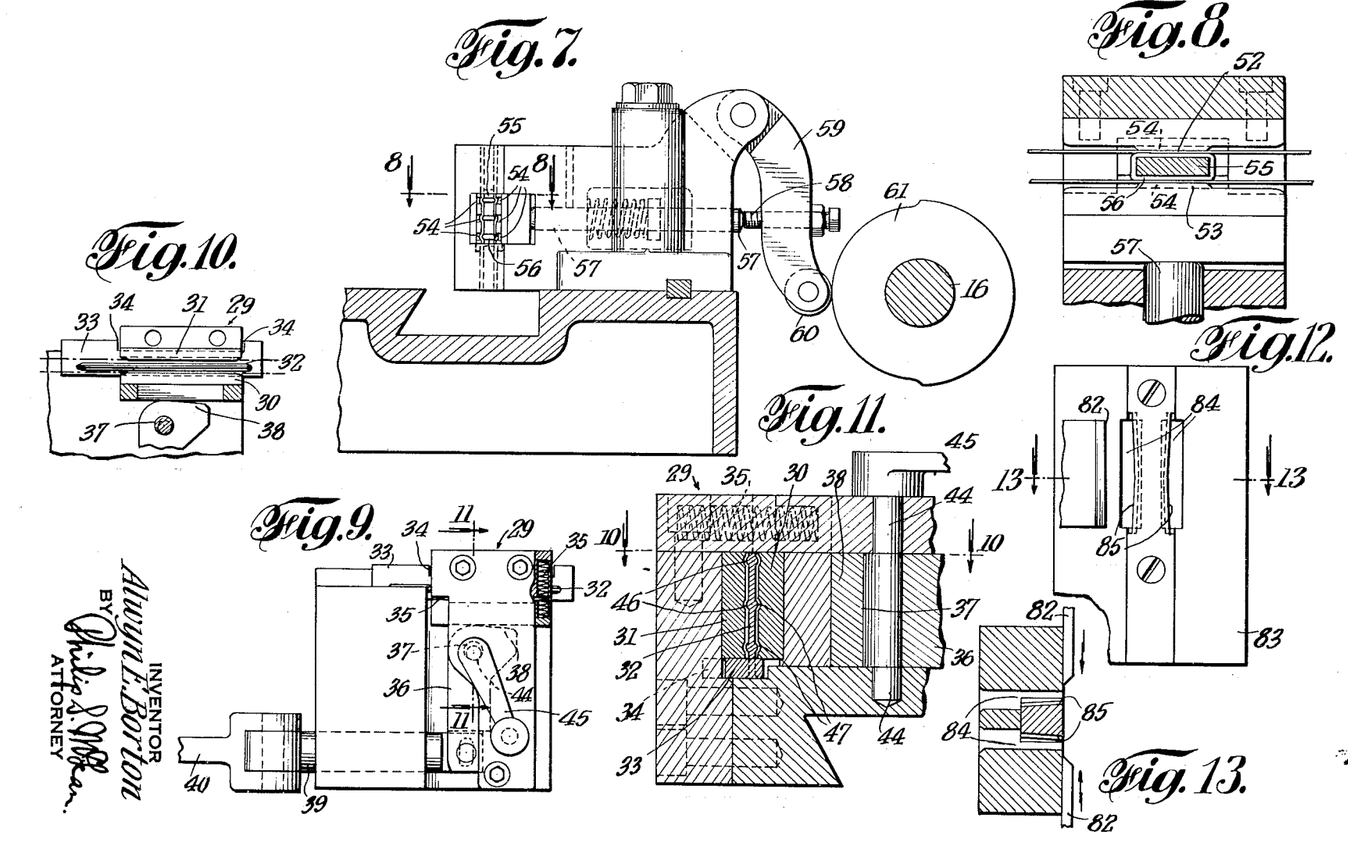
Fig. 7 is a broken sectional detail illustrating the forming dies, the same appearing as on substantially the plane of line 7—7 of Fig. 1.
Fig. 8 is an enlarged broken horizontal section as on line 8—8 of Fig. 7.
Fig. 9 is an enlarged broken plan and part sectional view of the combined feed slide and pre-forming mechanism.
Fig. 10 is a broken part sectional detail as on line 10—10 of Fig. 11 and illustrating particularly the cooperating jaws and interposed spreader of the two-strip feed slide.
Fig. 11 is a broken sectional detail of the two-strip feed slide as on substantially the plane of line 11—11 of Fig. 9.
Fig. 12 is a broken elevation of the two-strip guide.
Fig. 13 is a broken cross sectional view as on line 13—13 of Fig. 12 illustrating the knives which are carried by the tool slides and cooperate with the guide for simultaneously severing the two strips of stock.

This spacer has a self-adjusting floating fit between the jaws by being carried by a slide 33 notched at 34, Fig. 10, to fit about the base of the fixed jaw. This construction keys the strip separator to the slide so that it must follow the reciprocating feed movements of the slide but permits it to shift transversely in accordance with the jaw opening and jaw closing movements.

Springs indicated at 35 in Figs. 9 and 11 serve for opening the jaws and the closing of the jaws is effected by a lever 36 pivoted on the feed slide at 37 and having a bell-crank extension or cam portion 38 bearing against the back of the movable jaw. The jaw closing lever 36 is engaged at its outer end by a reciprocating link 39 guided in the body of the slide and connected at its outer end with a link 40 pivotally engaged with an oscillating lever 41, Fig. 1, actuated by link 42 from the crank disc 43 driven directly or indirectly from the shaft 15 at the left hand end of the machine.

As lever 41 is thus oscillated, the slide will be shifted back and forth and the jaw closing lever, through which the slide is operated, will be oscillated to effect the opening and closing movements of the jaws at the ends of the movements in opposite directions.

The pivot bearing 37 for the jaw closing lever is shown in Fig. 11 as journalled eccentrically at 44 in the feed slide and as equipped with a handle 45 by which it may be turned to shift the lever sufficiently to render it either operative or inoperative for closing the jaws on the stock. In the position indicated in Fig. 9, the lever 36 is effective for relatively closing the jaws to grip the two strips of stock against the opposite faces of the intermediate spreader or grip piece 32 and it will be evident from this same view that upon rotating the hand lever 45, the eccentrically mounted bearing for the lever may be shifted to back off the lever to a point where it will not close the jaws, in which event the feed slide may be permitted to continue its reciprocation without advancing the stock.

To initiate the forming operations and at the same time to gain a better grip on the stock the companion jaws and intermediate spreader of the feed slide may be shaped, for example as indicated in Fig. 11, with grooves 46 on the jaws and cooperating ribs 47 on the intermediate spreader. This construction reversely ribs the two strips of stock at the time such strips are gripped in the feed slide, providing thereby firm hold on the strips and partially forming them in preparation for a complete or final forming operation. This ribbing operation also stiffens the stock so that it will be advanced with certainty and accuracy from the feed slide to the forming tools.

Figure 1:
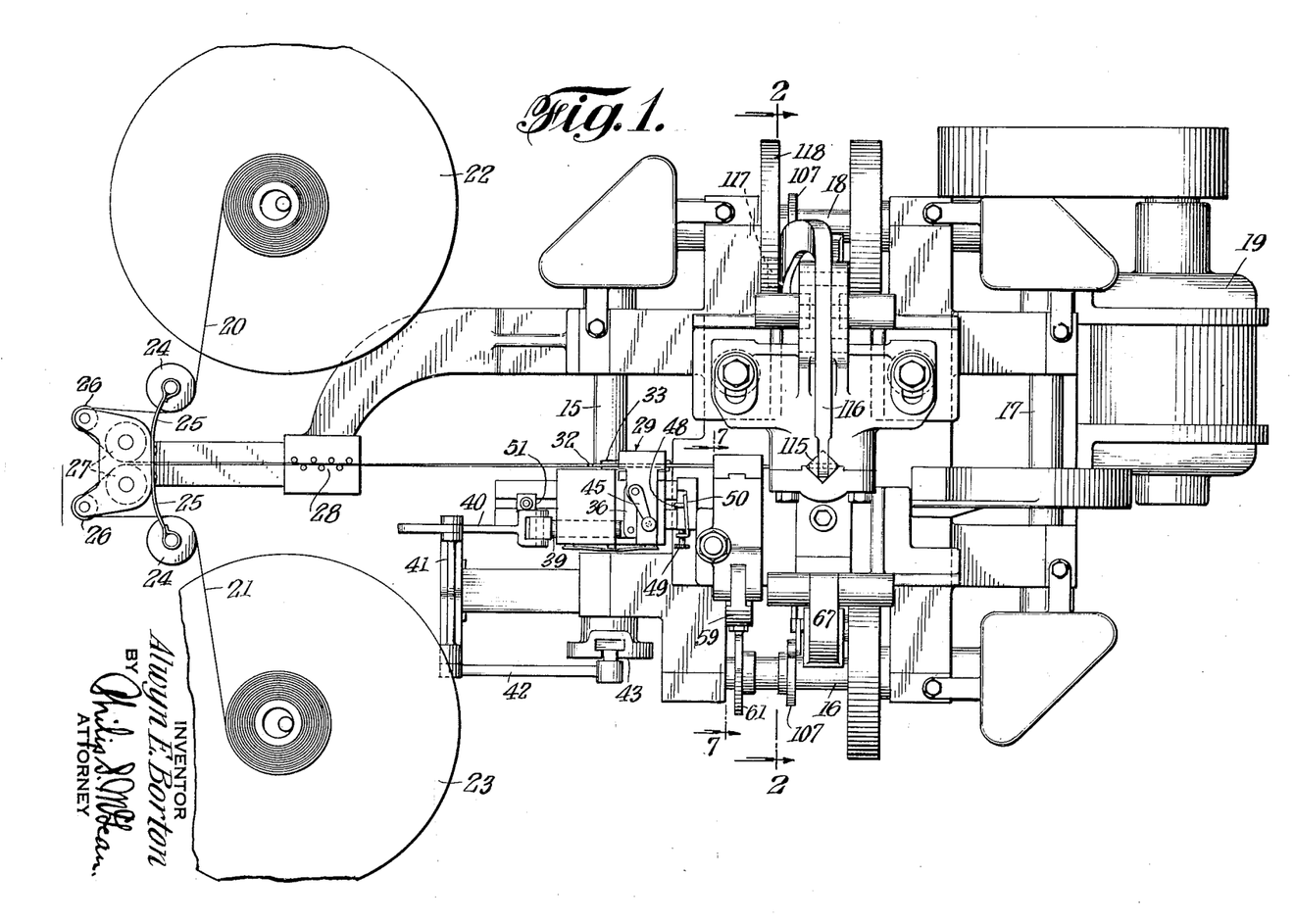
Fig. 1 is a partial plan view of a two-strip machine incorporating features of the invention and designed especially for producing the so-called "plates" used in radio tubes.

The feed stroke of the slide is shown as accurately governed by a forward stop 48 shiftable by a fine adjusting screw 49 over an incline 50, Fig. 1. The back stroke of the feed slide is shown as accurately regulated by an adjustable back stop 51.

The first forming tools are located next in advance of the feed slide and, as shown in Figs. 7 and 8, consist of relatively fixed and movable jaws or forming dies 52, 53 more deeply grooved than the feed slide jaws, as indicated at 54 and cooperating with an intermediate former in the nature of a mandrel 55 ribbed at 56 to match the grooves of the dies. This intermediate mandrel, like the intermediate strip separator of the feed slide has a transversely shifting floating mount in between the forming dies so that it may accommodate itself to the opening and closing movements of the jaws. The movable jaw is actuated in the illustration by a spring retracted plunger 57 bearing against the back of the jaw and engaged at its outer end by adjustable abutment 58, Fig. 7 on the pivoted rock lever 59, the latter carrying a cam roll 60 in engagement with cam 61 on the front cam shaft 16.

At a final stage in the machine, the ribbed strips of stock are further shaped, cut off, brought together, permanently secured by a "staking" operation and then stripped from a mandrel on which the last forming has been accomplished.

Figures 2, 4, 5:
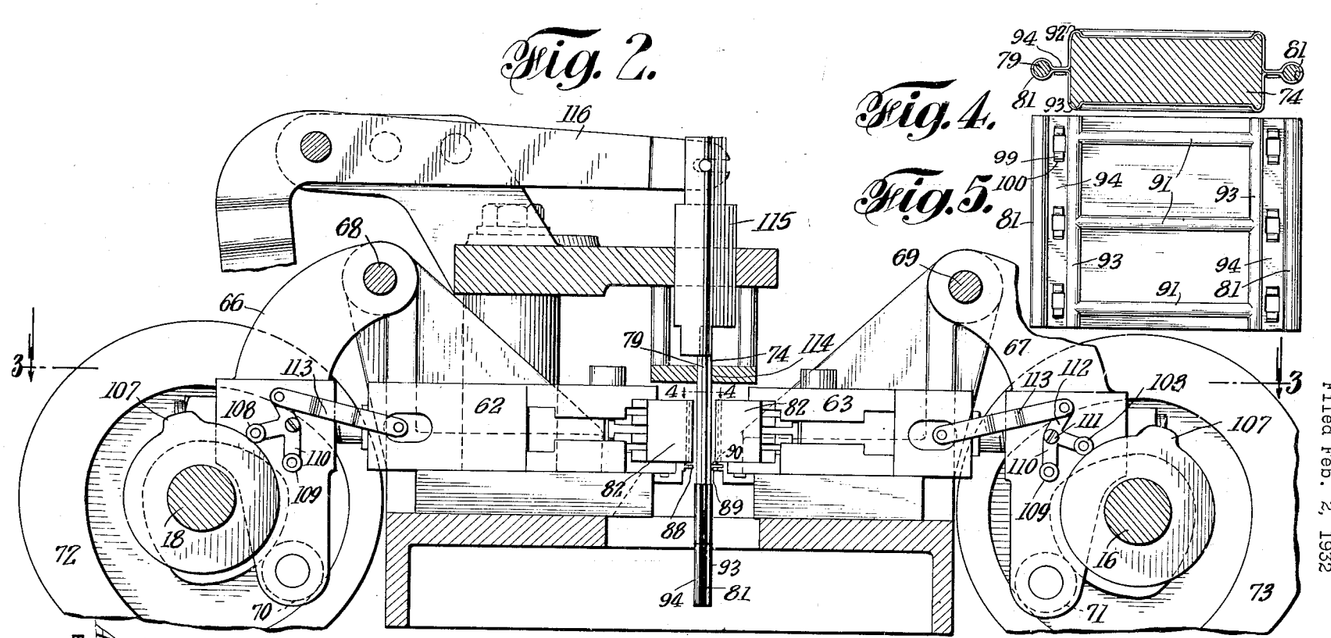
Fig. 2 is a broken vertical cross-sectional view of the machine as on substantially the plane of line 2—2 of Fig. 1.
Fig. 4 is an enlarged sectional detail as on substantially the plane of line 4—4 of Fig. 2, illustrating one of the assembled plate elements ready to be stripped from the mandrel.
Fig. 5 is a side elevation of the completed plate element.
Figure 3:
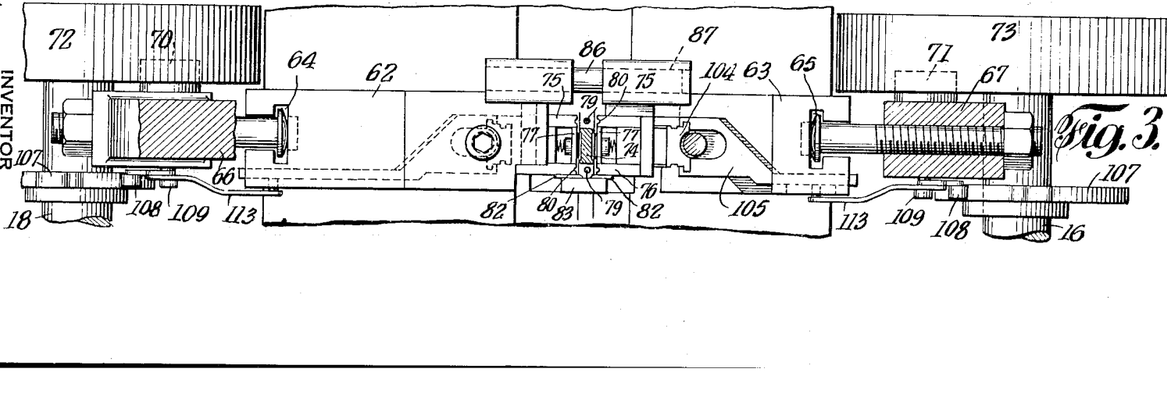
Fig. 3 is a broken horizontal sectional view as on substantially the plane of line 3—3 of Fig. 2.
Figures 6, 6A:
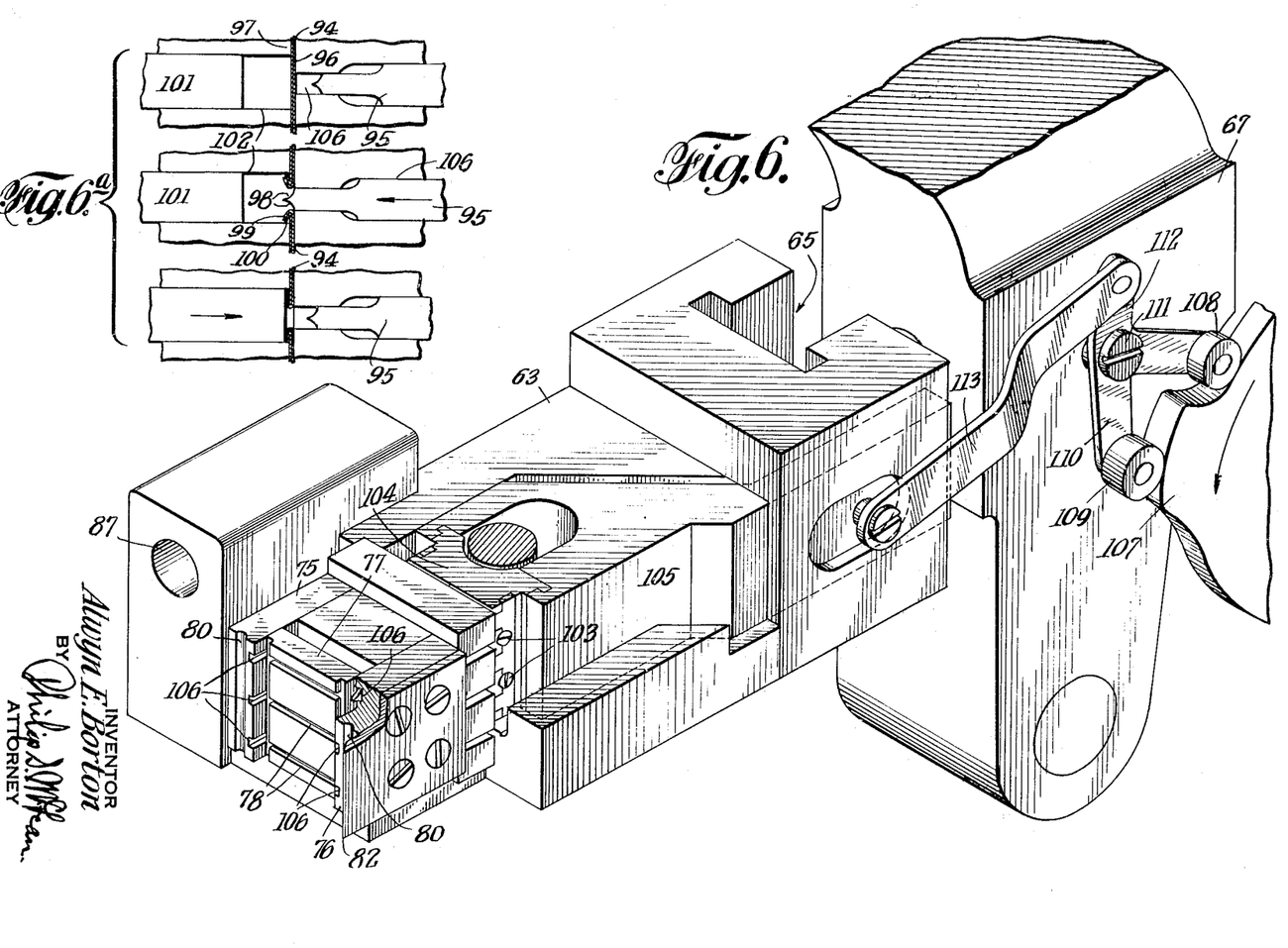
Fig. 6 is an enlarged broken part sectional perspective view of one of the compound slide mechanisms.
Fig. 6a is a combination view illustrating sequence of action in the staking operation.

These final stage operations will be understood by reference to Figs. 2, 3 and 6 which illustrate the two opposed tool slides 62, 63 operated through universal connections 64, 65 from rock levers 66, 67 pivotally hung on bearings 68, 69 and carrying cam rolls 70, 71 engaging grooved cams 72, 73 on the back and front cam shafts 18, 16, respectively. Between the opposed inner ends of the tool slides, a mandrel or former 74 is positioned and the tools are forked or yoked to operate about this mandrel. Thus as shown in Fig. 3, each slide carries bending formers 75, 76, spaced to operate across the ends of the mandrel and having between them the yielding spring-backed pressers 77, for cooperation with the side faces of the mandrel. As appears particularly in Fig. 6, the yielding pressers 77 are grooved as at 78 to fit about the ribbed portions of the stock.

The final-form mandrel 74 is shown in Figs. 2, 3 and 4 as having wires 79 at opposite sides of the same and the bending tools 75, 76, are shown as grooved in the ends of the same at 80, to bend the stock about these wires, to produce in the finished "plate" element the end loops or sleeves 81, Fig. 5, to slide over the wires or rod elements which support the plate in the finished tube.

The two strips are severed as the tool slides approach and as the repressible members 77 of the tool slides take hold of the stock against the intermediate mandrel. This is accomplished in the illustration by knives 82 on the faces of the bending guides 76, positioned to engage the two strips of stock projecting from the guide 83. This construction and relation is disclosed in detail in Figs. 12 and 13, where the guide is shown as having two passages 84, for the stock, which passages have inclined or flat V-shaped inner edges 85, to enable the knives to make a "shear" cut.

The tool slides may be guided at their inner opposing ends as by having one slide carry a pin 86, Figs. 3 and 6, sliding in a socket 87 in the end of the other slide. Additional guiding and cooperation of the parts may be provided, if desired, by means of interlocking tongue and groove elements 88, 89, Fig. 2, beneath the slides and slotted as indicated at 90, to pass about the mandrel wires 79. This construction definitely locates and braces these wires as the tool parts come together.

It will be understood from the foregoing, that the two strips of stock as they reach the final-forming tools are longitudinally ribbed as shown at 91, Fig. 5, and that as the yielding plungers 77 hold the stock against the opposite faces of mandrel 74 and the bending tools 75, 76, continuing in their movement, roll the stock about the rounded corners 92, of the mandrel, Fig. 4, the transverse ribs 93, will be produced connecting the longitudinal ribs 91, in the nature of a grid, which strengthens and stiffens the stock in this special shape. The two strips of stock are severed by the knives 82, approximately at the moment the tools take hold, to avoid interference as between the several stages of action. The bending tools 75, 76, as they continue their movement across the ends of the mandrel, carry the pieces of stock, now severed from the strips, smoothly across the ends of the mandrel, bend their end portions into the loops 81, about the mandrel wires and press the portions 94 into flat engagement in the spaces between the mandrel wires and the ends of the mandrel body, as appears in Fig. 4. While these parts 94 of the two members of the plate unit are thus held in flat engagement, additional tools are brought into operation to secure such parts together.

In the present illustration, the two duplicate plate parts are secured together by staking portions of one part through the other part to form in effect integral rivets. This action is illustrated in Fig. 6a, which shows successive steps in which a point or punch 95, drives through the parts 94, held between the shoulders 96, 97, on the two slides, piercing the two thicknesses and by the curved cams 98 at opposite sides of the point rolling out the lugs 99 of the first thickness back over the lugs 100 of the second thickness and how as a final measure, a blunt ended riveting plunger 101 at the opposite side then advances to flatten down the integral rivet lugs 99, 100. This riveting punch operates in a channel or slot 102, which, as appears in the last two figures of this compound view is wide enough to receive these lugs 99, 100 punched through and rolled back by the piercing plunger.

In the present instance, the plate parts are connected together by two sets of three rivets each and consequently there are two sets of three pairs of the piercing and flattening punches. In Fig. 6, the piercing punchers 95 are indicated as secured by screws 103, to opposite faces of a head 104, carried by an auxiliary slide 105, mounted on the main slide 63 and as operating in guide slots 106, in the inside faces of the bending dies 75, 76. This construction is repeated for the two sets of riveting punches on the opposite tool slide 62, as indicated by reference characters in Figs. 2 and 3.

The two sets of punches 95, 101, are operated in the timed relation above described by the cams 107, on shafts 16 and 18, which engage in sequence first the rolls 108 to advance the punches and then the rolls 109 to withdraw the punches, said rolls being carried by the arms of the forked rock levers 110, pivoted at 111 and provided with lever arms 112, pivotally connected by links 113 with the auxiliary slides 105 on the two main slides 62, 63. The auxiliary staking punches are thus caused to quickly pierce and rivet the plate parts together during a short period of rest, while the tools of the main slides firmly hold the parts together.

To strip the completed articles from the mandrel, the latter is made to reciprocate vertically, so as to carry the last completed article up against a stripper plate 114, Fig. 2, the stroke being sufficient to clear the mandrel for the next operation. One or more of the completed articles may remain on the lower end of the mandrel, as indicated, to serve for guiding and spacing the wires of the mandrel with respect to the main body of the mandrel, substantially as shown in this view. The vertically reciprocating head which carries the mandrel is designated 115, in Fig. 2, and is shown as operated by a rock lever 116, carrying a cam roll 117, Fig. 1, engaging a cam 118 on the back cam shaft 18. On each upstroke of the mandrel, it will be seen that the last completed plate held by engagement with the overstanding stripper will force a previously completed plate off the lower end of the mandrel, leaving for the next forming operation one or more plates in position to reinforce and space the mandrel wires. This sliding of the plates down over the mandrel also has a desirable "sizing" effect on the plates.

The simultaneous operation on two strips of material has many practical advantages and enables the formation and connection of separate parts not heretofore practically possible in a machine of this type.

The companion parts may or may not be exact duplicates, as will be readily appreciated and the nature of the forming and shaping naturally will vary with the character of the article to be produced. Two or more strips may be operated upon, all at the same time and be brought together, as completed, at the assembling station. The parts thus produced may be the companion pieces of a finished article, as in the present illustration, and be directly fastened together, or otherwise associated. The securing of the pieces by a staking or integral riveting operation as disclosed is particularly desirable, but it will be appreciated, that separate rivets, spot welding or other means of fastening may be employed.

The relative adjustability of the strip separator and the jaws at opposite sides of the same enables a practically simultaneous action on both strips and hence, in the case of the feed slide, a positive accurate feeding of the two strips of stock. While the separator plate is here shown as transversely adjustable with respect to both jaws, it is possible that the separator be fixed and that both jaws operate in self-adjusting relation to the separator. The simultaneously operating strip severing knives carried by the tool slides are important, accomplishing the quick severance of both strips at the moment they are ready for final forming and attaching operations.

What is claimed is:

1. A machine of the character disclosed, comprising in combination, means for feeding two strips of stock in face-to-face relation, means for forming said strips of stock while in such face-to-face relation, means for severing the strips in predetermined lengths and means for bringing the formed lengths together in face-to-face relation.

2. In combination, means for longitudinally advancing strips of stock in side-by-side relation, means for operating transversely on said strips of stock, means for severing the strips in predetermined lengths and transversely operating means for securing severed lengths of the strips together.

3. In combination, means for supporting and guiding strips of stock in face-to-face relation, means for feeding said strips of stock in such face-to-face relation, forming devices for operating on said several strips, means for severing the strips in predetermined lengths and means for securing said lengths in face-to-face relation.

4. A machine of the character disclosed, having a longitudinal feed line and comprising in combination horizontally acting forming devices at opposite sides of and operating transversely of the feed line, means for supporting and guiding a plurality of strips of stock to the feed line and a longitudinally operating feed device provided with means for gripping and advancing the plural strips of stock to the forming devices.

5. A machine of the character disclosed, having a longitudinally feed line and comprising in combination horizontally acting forming devices at opposite sides of and operating transversely of the feed line, means for supporting and guiding a plurality of strips of stock to the feed line, a longitudinally operating feed device provided with means for gripping and advancing the plural strips of stock to the forming devices and horizontally operating devices at opposite sides of the feed line for severing the strips in predetermined lengths and for attaching the predetermined lengths together.

6. In a machine of the character disclosed, cooperating opposed jaw members, means for directing strip stock in face-to-face relation between said jaw members, a forming separator positioned between said jaw members and means for relatively closing the jaw members to grip strips of stock against opposite faces of said interposed separator.

7. In a machine of the character disclosed, cooperating opposed jaw members, means for directing strip stock in face-to-face relation between said jaw members, a separator positioned between said jaw members and means for relatively closing the jaw members to grip strips of stock against opposite faces of said interposed separator, said separator and jaw members having registering strip forming projections and recesses on the opposing faces of the same.

8. In a machine of the character disclosed, cooperating opposed jaw members, means for directing strip stock in face-to-face relation between said jaw members, a forming separator positioned between said jaw members and means for relatively closing the jaw members to grip strips of stock against opposite faces of said interposed separator, said separator having a self-adjusting mounting between the jaw members.

9. In a machine of the character disclosed, cooperating opposed jaw members, means for directing strip stock in face-to-face relation between said jaw members, a forming separator positioned between said jaw members, means for relatively closing the jaw members to grip strips of stock against opposite faces of said interposed separator, one jaw member being fixed and the other being movable and the interposed separator having a loose self-adjusting mounting between said jaw members.

10. In a machine of the character disclosed, cooperating opposed jaw members, means for directing strip stock in face-to-face relation between said jaw members, a separator positioned between said jaw members and means for relatively closing the jaw members to grip strips of stock against opposite faces of said interposed separator, the separator being ribbed and the jaw members being correspondingly grooved in the opposed faces of the same to form the stock engaged thereby.

11. In a machine of the character disclosed, cooperating opposed jaw members, means for directing strip stock in face-to-face relation between said jaw members, a forming separator positioned between said jaw members, means for relatively closing the jaw members to grip strips of stock against opposite faces of said interposed separator and means for bodily shifting the jaw members to simultaneously advance strips of stock gripped thereby.

12. In a machine of the character disclosed, cooperating opposed jaw members, means for directing strip stock in face-to-face relation between said jaw members, a separator positioned between said jaw members, means for relatively closing the jaw members to grip strips of stock against opposite faces of said interposed separator, means for bodily shifting the jaw members to simultaneously advance strips of stock gripped thereby and companion elements on said jaw members and interposed separator for forming the strips gripped thereby.

13. In combination, a reciprocating carriage, cooperating strip gripping forming members carried thereby and an interposed strip separator movably mounted between said gripping members.

14. In combination, a feed carriage, a fixed jaw member on said carriage, a movable jaw member on the carriage in opposed relation to the fixed jaw member, a strip separator movably supported on the carriage between the fixed and movable jaw members and means for effecting opening and closing movements of the movable jaw member relatively to the fixed jaw member and interposed strip separator, said jaw members and strip separator having cooperating portions for forming stock engaged therebetween.

15. In combination, a feed carriage, a fixed jaw member on said carriage, a movable jaw member on the carriage in opposed relation to the fixed jaw member, a strip separator movably supported on the carriage between the fixed and movable jaw members and means for effecting opening and closing movements of the movable jaw member relatively to the fixed jaw member and interposed strip separator, said jaw members and strip separator having cooperating portions for forming stock engaged therebetween, the strip separator having a base portion keyed on the carriage with freedom for limited movement, thereby requiring the separator to travel with the carriage and the limited movement enabling same to adjust itself to the two strips of stock engaged between the jaw members and strip separator.

16. In combination, a reciprocating feed carriage, opposed jaw members carried thereby, means for effecting relative gripping and releasing movements of said jaw members and a strip separator interposed between said jaw members, said jaw members and strip separator having cooperating portions for forming stock engaged therebetween said strip separator being mounted for travel with the carriage but free to adjust itself to thickness of strips of stock interposed between the jaw members and strip separator.

17. In combination, a strip feeder for gripping and simultaneously advancing two strips of stock in side-by-side relation and including cooperating jaws and an intermediate strip forming separator, forming means including cooperating forming dies and an intermediate mandrel for simultaneously operating on both strips of stock advanced by the double strip feeder and final-forming mechanism including cooperating forming dies and an intermediate mandrel for operating on the two strips acted on by the first forming means.

18. In combination, a strip feeder for gripping and simultaneously advancing two strips of stock in side-by-side relation, forming means for simultaneously operating on both strips of stock advanced by the double strip feeder and final-forming mechanism for operating on the two strips acted on by the first forming means and including cooperating forming dies and an intermediate mandrel and double-acting cutter mechanism for severing both strips of stock when held by said forming dies on said intermediate mandrel.

19. In combination, a strip feeder for gripping and simultaneously advancing two strips of stock in side-by-side relation, forming means for simultaneously operating on both strips of stock advanced by the double strip feeder, final-forming mechanism including cooperating forming dies and an intermediate mandrel for operating on the two strips acted on by the first forming means and means for automatically securing the formed strip portions together while held by said forming dies on said intermediate mandrel.

20. In combination, a strip feeder for gripping and simultaneously advancing two strips of stock in side-by-side relation, forming means for simultaneously operating on both strips of stock advanced by the double strip feeder final-forming mechanism for operating on the two strips acted on by the first double-acting forming means, including cooperating forming dies and an intermediate strip separating mandrel and cutter mechanism for severing both strips of stock and means for automatically securing the formed and severed portions of the strips together while held by said forming dies on said intermediate mandrel.

21. A machine of the character disclosed, comprising in combination, a strip forming feed device for simultaneously forming and advancing two strips of stock through the machine, stock supporting tables at opposite sides of the feed lines and guides for directing strips of stock from said tables to said feed line and including spring tensioned guide rolls engaged respectively with the strips of stock.

22. In a machine of the character disclosed, the combination of opposed tool slides, a forming mandrel interposed between said tool slides and extending at both ends beyond said tool slides, a stripper cooperating with one portion of said mandrel and means for reciprocating said mandrel to cause an article engaged about the mandrel by the tool slides to engage the stripper and thereby force a previously completed article off the extended end of the mandrel.

23. In combination, a mandrel having relatively separated portions, means for forming an article about said relatively separated portions of the mandrel, said mandrel being of sufficient extent to hold an article previously completed in addition to an article being formed thereon and means for shifting the last completed article far enough on the mandrel to strip off a previously completed article and to leave the last-completed article clear of the article forming means and in position bracing the relatively separated portions of the mandrel for the next forming operation.

24. In combination, a mandrel comprising a mandrel body and mandrel wire in spaced relation, means for forming an article about said separated mandrel body and mandrel wire, said mandrel being of sufficient extent to hold a completed article thereon in addition to the article being formed thereabout and means for effecting the shifting of the last-completed article on the mandrel to clear it of the forming means and to crowd a previously completed article off the mandrel and thereby leaving said last-completed article in position bracing the mandrel wire to the mandrel body for the next forming operation.

25. A mandrel having separated portions, means for forming an article about said separated portions and means for effecting the retention of a completed article on the mandrel and for discharging a previously completed article and thereby to brace the separated portions of the mandrel for the next forming operation.

26. In a machine of the character disclosed, cooperating opposed forming slides, a guide having separate ways for strips of stock and knives operated by said slides for severing the strips of stock guided in said ways.

27. In a machine of the character disclosed, cooperating opposed forming slides, auxiliary slides mounted on said forming slides, means for operating the forming slides and means for operating the auxiliary slides independently of the operation of said forming slides.

28. In a machine of the character disclosed, cooperating opposed forming slides, auxiliary slides mounted on said forming slides, means for operating the forming slides, means for operating the auxiliary slides independently of the operation of said forming slides, including forked rock levers and cams cooperating with the forked arms of said rock levers.

29. In a machine of the character disclosed, cooperating opposed forming slides, auxiliary slides mounted on said forming slides, means for operating the forming slides, means for operating the auxiliary slides independently of the operation of said forming slides and fastening tools carried by said auxiliary slides.

30. In a machine of the character disclosed, the combination with cooperating forming dies, of opposed piercing and flattening-down punches, with means for supporting layers of strip stock between said punches, the piercing punch being pointed and inclined at opposite sides of the point thereof to pierce and roll back integral portions of the layers, the supporting means being slotted to freely receive the rolled back portions struck by the piercing punch, the flattening-down punch being of greater width than the piercing punch to flatten-down the rolled back portions struck by the piercing punch, the supporting means comprising abutment faces on cooperating main slides, auxiliary slides mounted on said main slides and carrying the piercing and flattening-down punches and means for cooperating the main and auxiliary slides in coordinated timed relation.

31. A machine of the character disclosed, having a longitudinal feed line and comprising in combination horizontally acting forming devices at opposite sides of and operating transversely of the feed line, means for supporting and guiding a plurality of strips of stock to the feed line, a longitudinally operating feed device provided with means for gripping and advancing the plural strips of stock to the forming devices, including a strip separator positioned between strips of the stock and jaws for gripping the strips of stock against the separator, said separator and jaws being relatively self-adjustable to enable the substantially simultaneous gripping of the strips at opposite sides of the separator.

32. In a machine of the character disclosed, the combination of a strip forming separator and cooperating strip forming and gripping jaws at opposite sides of said separator, means for effecting opening and closing movements of the jaws and means for enabling relative self-adjusting movements of strip separator and jaws for effecting substantially simultaneous gripping of the strips against opposite sides of the strip separator.

33. In a machine of the character disclosed, cooperating forming slides for simultaneously operating on two strips of stock and knives actuated by said forming slides for substantially simultaneously severing said two strips of stock.

34. In a machine of the character disclosed, the combination of relatively separable companion stock engaging and intermediate stock separating members having cooperating strip forming projections and recesses in the opposing faces of the same and means for relatively closing and for bodily shifting said companion stock forming and supporting members for forming and feeding separate strips of stock engaged thereby.

35. In a machine of the character disclosed, the combination of means for supporting and guiding strips of stock vertically on edge and in face-to-face relation, means for simultaneously gripping and horizontally advancing said face-to-face strips, horizontally acting forming members at opposite sides of and acting on the advanced strips and means for automatically severing said thus formed portions of the strips.

ALWYN E. BORTON.